UNITED STATES PATENT OFFICE.

GEORGE S. GRAY, OF CINCINNATI, OHIO.

IMPROVEMENT IN PROCESSES OF CURING MEATS.

Specification forming part of Letters Patent No. 195,758, dated October 2, 1877; application filed July 13, 1877.

*To all whom it may concern:*

Be it known that I, GEORGE S. GRAY, of Cincinnati, Hamilton county, Ohio, have invented a new and Improved Process of Curing Meat, of which the following is a specification:

The following is a full, clear, and exact description of my new and improved process.

Heretofore meat has been cured either by dry salt or pickle.

In the former process the dry salt is put on the meat, and by the juices exuding from the flesh is dissolved into brine.

In the pickle process the salt is first dissolved in water, and, a brine of proper strength being formed, the meat is immersed in it and kept immersed until it is cured.

In either process the brine is formed, and, by natural action of endosmose and exosmose, so called, it gradually saturates the meat. The time required varies with the size of the pieces of meat to be cured—hams requiring five to eight weeks.

In the dry-salt process the brine formed is very strong, and the meat when cured becomes hard and extremely salt. It, therefore, is used chiefly for the lower-priced cuts.

In the pickle process the strength of the brine can be reduced to the limit necessary to preserve or cure the flesh, and sugar or other substances can be added to improve the flavor, color, &c. This process is, therefore, used for the more valuable cuts, and especially for hams.

The process which I have invented requires not over one-third of the time consumed by the old methods. It requires also much less labor, and substitutes for the expensive and cumbersome apparatus used in the pickle process appliances of little cost and of extremely simple construction.

In carrying out this process any suitable receptacle for holding the pickle may be employed.

Using the ordinary pickle of proper strength and flavor, I cause it to flow rapidly and continuously through the receptacle and over the meat immersed therein. As it flows from this vessel or receptacle it is again returned thereto by a pump or other suitable means, and is again caused to flow over the meat, and so on, making a constant current or flow of the pickle or brine over the meat until it is cured.

The rapid movement of the pickle over the meat quickens the action of absorption, or of endosmose and exosmose, so that in a few days a result is obtained which requires weeks when the meat is simply immersed in the pickle without any movement or flow of the same.

The cost of keeping up this constant current of the pickle through the vessel, and in consequence over the meat, especially in establishments where steam is used, (and there are few where it is not,) would be insignificant.

The above-described method of curing meat—that is to say, by keeping it immersed in a rapidly and constantly flowing stream or current of pickle—constitutes my improved process.

It is evident that in carrying this process into operation a variety of devices may be employed for causing this flow or current. One of these methods which I have found useful I propose to describe herein.

I have a tight trough of wood or metal about twelve inches wide and of the same height, but of any suitable length, having a slight inclination in the direction of its length. A series of similar troughs may be connected together or placed under each other, so that when the liquid comes to the end of one it drops to the upper end of the next, runs through the length of it, and so on through the series. These inclined troughs are filled with meat, and the pickle, starting at the uppermost, runs rapidly through them, and is pumped back again to the starting-point from the lowest end of the lowest trough, thus maintaining a constant current.

Should the apparatus in any way become out of order, it will be readily seen that by any simple means the flow of the pickle can be stopped without exposing the meat to the air.

It will also be seen that any mechanical appliances may be used that will maintain a constant current, and at the same time keep the meat entirely immersed.

The advantages of curing meat by my process are, first, the great saving of time; this is of great importance, as it enables one to take advantage of the market, and makes the cost of outlay much less, and in warm weather it causes a great saving of expense for ice; second, reduced risk of damage to the meat; third, economy of labor; fourth, cheapness and simplicity of apparatus; fifth, superiority in the product produced.

I am aware that in the dry-salt process it has been proposed to arrange the meat on racks, row above row, and lift the pickle by a pump from the bottom of the chamber to an elevated perforated platform or tank, from which it drips over the meat, and gradually descends again to the bottom of chamber; also, that in the immersion process agitation of both the pickle and the meat has been resorted to. My process is different from either of these.

What I claim as my invention, and desire to secure by Letters Patent, is—

The herein-described process of curing meats—that is to say, by causing the pickle to flow in a continuous stream over the meat which is immersed therein.

GEORGE S. GRAY.

Witnesses:
DANL. KELLY,
ARTHUR STEM.